(12) United States Patent
Maruyama et al.

(10) Patent No.: US 10,654,104 B2
(45) Date of Patent: May 19, 2020

(54) SINTERED BEARING

(71) Applicants: Diamet Corporation, Niigata-shi (JP); MITSUBISHI CABLE INDUSTRIES, LTD., Tokyo (JP)

(72) Inventors: Tsuneo Maruyama, Niigata (JP); Yoshinari Ishii, Niigata (JP); Nobukazu Fujii, Arida (JP); Takayuki Suenaga, Amagasaki (JP)

(73) Assignees: Diamet Corporation, Niigata-shi (JP); MITSUBISHI CABLE INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/462,389

(22) PCT Filed: Nov. 16, 2017

(86) PCT No.: PCT/JP2017/041257
§ 371 (c)(1),
(2) Date: May 20, 2019

(87) PCT Pub. No.: WO2018/097024
PCT Pub. Date: May 31, 2018

(65) Prior Publication Data
US 2019/0366440 A1 Dec. 5, 2019

(30) Foreign Application Priority Data
Nov. 24, 2016 (JP) .................. 2016-228111

(51) Int. Cl.
*F16C 33/02* (2006.01)
*F16C 33/74* (2006.01)
(Continued)

(52) U.S. Cl.
CPC ............... *B22F 5/00* (2013.01); *F16C 33/74* (2013.01); *F16J 15/18* (2013.01)

(58) Field of Classification Search
CPC ........ F16C 17/02; F16C 33/74; F16C 33/104; F16C 33/128
(Continued)

(56) References Cited

U.S. PATENT DOCUMENTS 4,127,310 A    11/1978  Werner
5,833,370 A *  11/1998  Ikeda .................... F04D 29/063
                                                384/125
(Continued)

FOREIGN PATENT DOCUMENTS

CN    1534849 A    10/2004
CN    104736891 A   6/2015
(Continued)

OTHER PUBLICATIONS

International Search Report dated Feb. 13, 2018 for the corresponding PCT/JP2017/041257.
(Continued)

*Primary Examiner* — Phillip A Johnson
(74) *Attorney, Agent, or Firm* — Leason Ellis LLP

(57) ABSTRACT

A sintered bearing comprises: a bearing sleeve that is formed of a sintered material and has a shaft hole; an annular ring-shaped seal member that is disposed such that one surface thereof comes into contact with the bearing sleeve; and a washer member that comes into contact with the other surface of the seal member on a side opposite to the one surface and is configured for the seal member to engage with the bearing sleeve. The washer member is fixed to the bearing sleeve.

6 Claims, 3 Drawing Sheets

(51) Int. Cl.
*B22F 5/00* (2006.01)
*F16J 15/18* (2006.01)

(58) Field of Classification Search
USPC .................................................. 384/130, 279
See application file for complete search history.

(56) References Cited

U.S. PATENT DOCUMENTS

| | | | |
|---|---|---|---|
| 7,251,891 B2 * | 8/2007 | Nii | F16C 33/14 |
| | | | 29/898.02 |
| 8,322,497 B2 | 12/2012 | Marjoram et al. | |
| 2003/0102635 A1 | 6/2003 | Akita et al. | |
| 2007/0183696 A1 * | 8/2007 | Winterhalter | F16C 33/10 |
| | | | 384/100 |
| 2011/0094481 A1 | 4/2011 | Zui et al. | |
| 2012/0073139 A1 | 3/2012 | Mizutani | |

FOREIGN PATENT DOCUMENTS

| | | |
|---|---|---|
| CN | 104948740 A | 9/2015 |
| CN | 104948741 A | 9/2015 |
| DE | 19646568 A1 | 5/1998 |
| JP | 2003-202022 A | 7/2003 |
| JP | 2004-068074 A | 3/2004 |
| JP | 2006-063398 A | 3/2006 |
| JP | 2007-032301 A | 2/2007 |
| JP | 2009-127722 A | 6/2009 |
| JP | 2013-007266 A | 1/2013 |
| JP | 2015-194246 A | 11/2015 |
| JP | 2016-173168 A | 9/2016 |
| WO | WO-02/073053 A | 9/2002 |
| WO | WO-2010/018650 A | 2/2010 |

OTHER PUBLICATIONS

Chinese Office Action dated Jan. 21, 2020 for the corresponding Chinese Patent Application No. 201780071233.2.

* cited by examiner

SINTERED BEARING

CROSS-REFERENCE TO RELATED PATENT APPLICATIONS

This application is a U.S. National Phase Application under 35 U.S.C. § 371 of International Patent Application No. PCT/JP2017/041257, filed Nov. 16, 2107, and claims the benefit of Japanese Patent Application No. 2016-228111, filed on Nov. 24, 2016, all of which are incorporated herein by reference in their entirety. The International Application was published in Japanese on May 31, 2018 as International Publication No. WO/2018/097024 under PCT Article 21(2).

FIELD OF THE INVENTION

The present invention relates to a sintered bearing which supports a shaft member by using a sintered material.

BACKGROUND OF THE INVENTION

Sintered materials have many advantages in that they can be manufactured through mass production with stable quality and can also adopt a composition unsuitable for smelting materials. Furthermore, sintered materials can be used for manufacturing a porous body. Sintered products which require a little trouble for supplying lubricating oil and can be disposed at a place unsuitable for supplying oil, that is, sintered products suitable for bearings, such as oil retaining bearings in which lubricating oil that has been absorbed inside pores of a porous body can equally exude from a surface, and dry bearings (dry friction bearings) which require no lubricating oil due to graphite or the like contained in material powder with lubricity, are realized by utilizing such properties. Sintered products have been widely used as sintered bearings in the related art (for example, refer to Japanese Unexamined Patent Application, First Publication No. 2004-68074 and Japanese Unexamined Patent Application, First Publication No. 2006-63398).

EGR valves, in which such a sintered bearing is used as a bearing for supporting a valve shaft of an exhaust gas recirculation (EGR) device, for example, and is assembled in a set with a lip seal for the purpose of preventing exhaust gas, liquid, or the like from flowing out in an axial direction of the valve shaft, are known (for example, refer to Japanese Unexamined Patent Application, First Publication No. 2013-7266). Moreover, regarding sintered bearings including a seal for preventing gas or liquid from flowing out in the axial direction, for example, sintered bearings in which a seal member is integrated with a bearing member are known (for example, refer to Japanese Unexamined Patent Application, First Publication No. 2003-202022). In addition, valves including a valve body in which a seal member is integrated with a bearing member are also known (for example, refer to PCT International Publication No. WO2010/018650).

Technical Problem

However, for example, in a configuration in which a seal holding member holding a seal member is incorporated separately from a bearing member as in Japanese Unexamined Patent Application, First Publication No. 2013-7266, there is a need to form a seal holding member separately from the bearing member in order to hold a seal, and there is a problem that its structure is complicated, resulting in high manufacturing cost. In addition, in a configuration in which a resin seal is insert-molded in an end portion of a bearing member, the seal member easily peels off from the bearing member, and it is difficult to integrate the seal member formed of a resin with the bearing member constituted of a sintered body.

The present invention has been made in consideration of the circumstances described above, and an object thereof is to provide a sintered bearing, which integrally includes a seal member inhibiting a fluid from moving in an axial direction, in a simple configuration at low cost.

SUMMARY OF THE INVENTION

Solution to Problem

That is, a sintered bearing of the present invention has the following configuration.

The sintered bearing includes a bearing sleeve formed of a sintered material, a shaft hole being formed therein, an annular ring-shaped seal member that is disposed such that one surface thereof comes into contact with the bearing sleeve, and a washer member that comes into contact with an other surface of the seal member on a side opposite to the one surface and is configured for the seal member to engage with the bearing sleeve.

The washer member is fixed to the bearing sleeve.

According to the sintered bearing having such a configuration, the sintered bearing functions as a component in which a bearing sleeve that supports a shaft of an instrument or the like, and a seal member that inhibits a fluid from moving along the shaft are integrated.

Accordingly, compared to a case where a bearing that supports a shaft and a seal that inhibits a fluid from moving along the shaft are individually incorporated as separate members, it is possible to realize a component having both functions of a bearing and a seal for a fluid in a simple configuration at low cost. In the case of having a simpler configuration, the reliability of a sintered bearing integrally including a seal member is improved.

In addition, compared to a configuration in which a seal member is directly bonded to a bearing sleeve by holding the seal member constituted of a soft member such as an elastomer or a resin in a manner of being interposed between the bearing sleeve and a washer member, there is no disadvantage in that the seal member peels off from the bearing sleeve, so that it is possible to realize a highly reliable sealing function.

The bearing sleeve includes a flat surface extending in a direction perpendicular to an axial direction between one end of the bearing sleeve in the axial direction and the other end thereof in the axial direction, and the one surface of the seal member comes into contact with the flat surface.

The seal member is sandwiched between a shaft end surface of the bearing sleeve on one side and the washer member.

An inner diameter of the seal member is smaller than a diameter of the shaft hole of the bearing sleeve.

Advantageous Effects of Invention

According to the sintered bearing of the present invention, it is possible to provide the sintered bearing, which integrally includes the seal member inhibiting a fluid from moving in the axial direction, in a simple configuration at low cost.

DETAILED DESCRIPTION OF THE INVENTION

Figure 1:
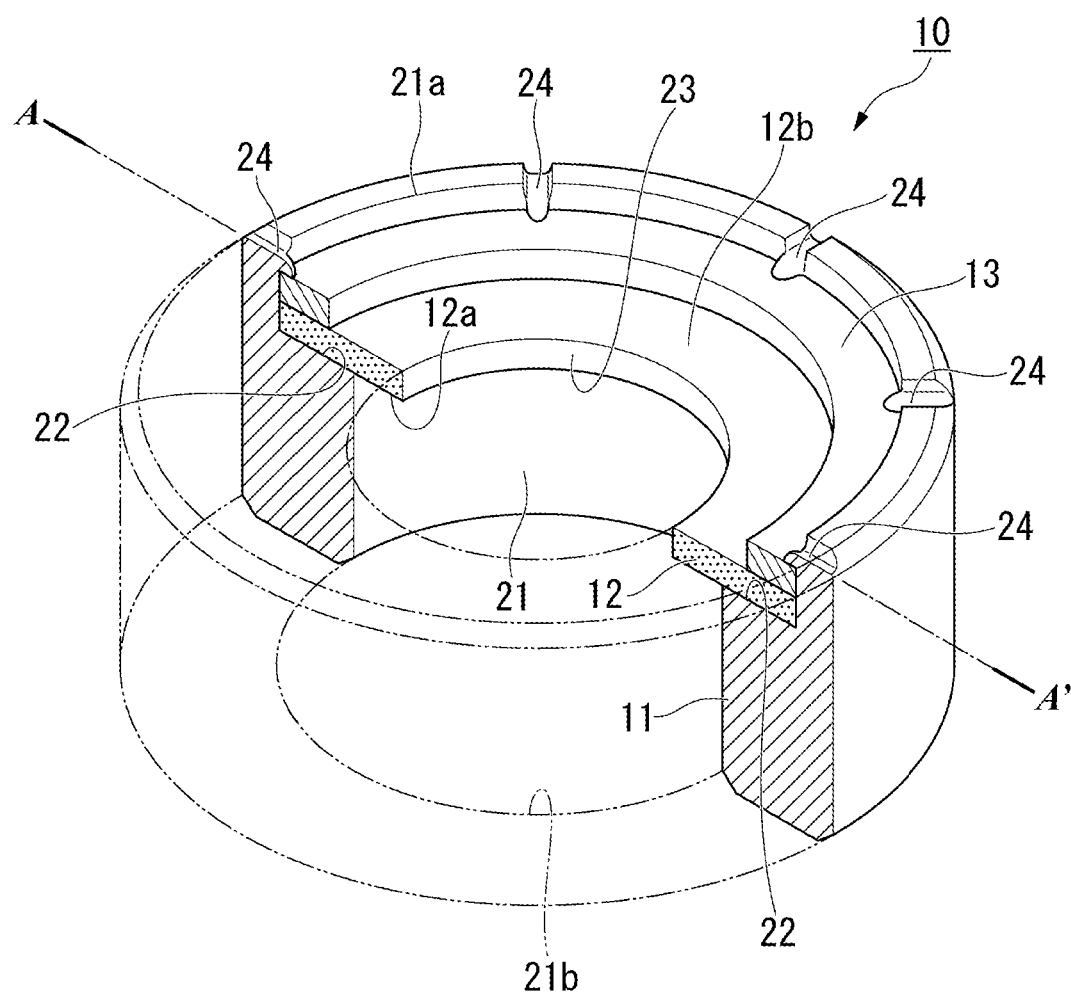
FIG. 1 is a partially cut perspective view illustrating a sintered bearing according to a first embodiment of the present invention.

Hereinafter, a sintered bearing as an embodiment in which the present invention is applied will be described with reference to the drawings. Each of the following embodiments specifically describes the invention for better understanding of the gist thereof and does not limit the present invention unless otherwise specified. In addition, in the drawings used in the following description, in order to make the features of the present invention easy to understand, there are cases where main parts are enlarged for the sake of convenience. Dimensional ratios and the like of constituent elements are not necessarily the same as actual dimensional ratios.

First Embodiment

Figure 2:
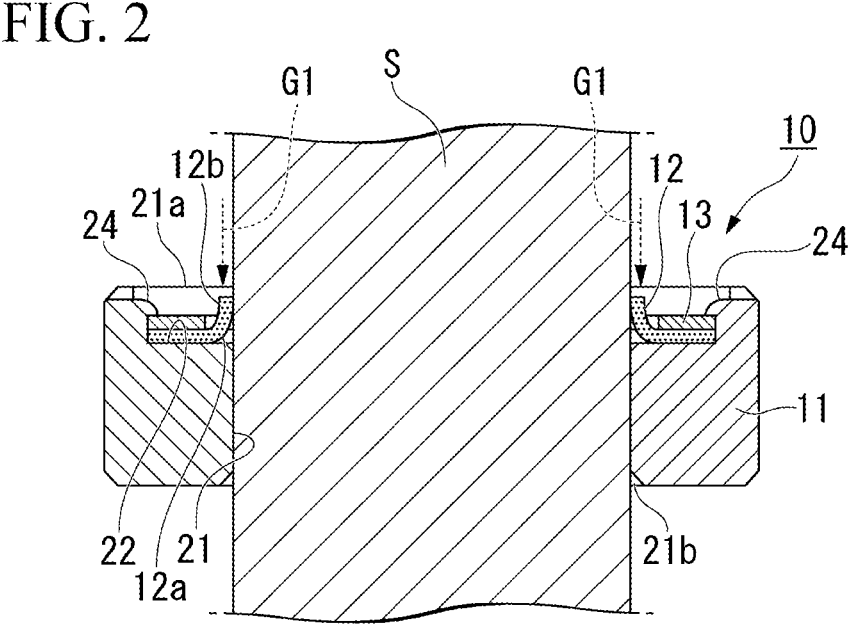
FIG. 2 is a cross-sectional view illustrating a state where a shaft is held in the sintered bearing illustrated in FIG. 1.

FIG. 1 is a partially cut perspective view illustrating a sintered bearing according to a first embodiment of the present invention. In addition, FIG. 2 is a cross-sectional view taken along line A-A' in FIG. 1, illustrating a state where a shaft is held in the sintered bearing of FIG. 1.

For example, a sintered bearing 10 is used as a constituent component of an EGR valve provided in an EGR path of an EGR device. In a housing of the EGR valve, in order to cause a valve body to be opened and closed with respect to a valve seat, a valve shaft S subjected to reciprocating motion (stroke motion) by an actuator is provided via the sintered bearing 10. This sintered bearing 10 is a member in which a function as a seal for air-tightly sealing a gap between the valve shaft S and the housing, and a function as a bearing are integrated.

The sintered bearing 10 is constituted of a substantially cylindrical bearing sleeve 11, an annular ring-shaped seal member 12, and a washer member (engagement member) 13.

The bearing sleeve 11 is formed of a sintered material, particularly a metal-based sintered material including carbon or the like as a solid lubricant, for example, a bronze-based (Cu—Sn—C) material, a phosphor bronze-based (Cu—Sn—P—C) material, a white copper-based (Cu—Ni—Sn—C and Cu—Ni—Sn—P—C) material, and a nickel copper-based (Ni—Cu—Sn—P—C and Ni—Cu—Sn—P—BN) material. For example, a shaft hole 21 for penetrating the valve shaft S of the EGR valve along a center axis Q is formed in a central portion of the bearing sleeve 11. The bearing sleeve 11 includes a flat surface 22 extending in a direction perpendicular to an axial direction between one end 21a in the axial direction and the other end 21b in the axial direction.

The seal member 12 is formed of an elastomer, a resin, or the like, for example, a polyurethane rubber or a tetrafluoroethylene resin. For example, an inner circumferential surface 23 for penetrating the valve shaft S of the EGR valve is formed. The seal member 12 is disposed such that one surface 12a comes into contact with the flat surface 22 of the bearing sleeve 11.

The diameter of the inner circumferential surface 23 of the seal member 12, that is, the inner diameter of the seal member 12 is smaller than the diameter of the shaft hole 21 of the bearing sleeve 11 and is smaller than the diameter of the valve shaft S, that is, a shaft diameter. Accordingly, as illustrated in FIG. 2, for example, when the valve shaft S of the EGR valve is inserted into the sintered bearing 10 from the one surface 12a side of the seal member 12 which comes into contact with the flat surface 22 of the bearing sleeve 11, the inner circumferential surface 23 is curved to the other surface 12b side on a side opposite to the one surface 12a of the seal member 12, and an inner circumferential edge on the inner circumferential surface 23 comes into tight contact with the valve shaft S, in the seal member 12 including the inner circumferential surface 23 having a diameter smaller than the diameter of the valve shaft S. The seal member 12 can have a curved shape in advance.

The washer member (engagement member) 13 is a plate-shaped member. For example, it is a metal member formed of a stainless steel, an aluminum alloy, or a steel material, or it is formed of a ceramic or a resin. The washer member (engagement member) 13 comes into contact with at least the other surface 12b of the seal member 12 and causes the seal member 12 to engage with the bearing sleeve 11. For example, this washer member 13 engages with the bearing sleeve 11 due to a plurality of caulking portions 24, 24, and so on formed in a circumferential edge part of the one end 21a of the bearing sleeve 11 in the axial direction. The seal member 12 is sandwiched between this washer member 13 and the flat surface 22 of the bearing sleeve 11 and is fixed to the bearing sleeve 11. The plate thickness of the washer member (engagement member) 13 is within a range of approximately 0.3 mm to 2 mm, for example.

Due to such a configuration, the sintered bearing 10 functions as a component in which the bearing sleeve 11 supporting the shaft, for example, the valve shaft S of the EGR valve, and the seal member 12 inhibiting a fluid, for example, gas from moving along the shaft are integrated.

In the present embodiment, the seal member 12 constituted of a soft member such as an elastomer or a resin is interposed between the bearing sleeve 11 and the washer member 13 and engages with the bearing sleeve 11 due to the plurality of caulking portions 24, 24, and so on formed in the circumferential edge part of the one end 21a of the bearing sleeve 11 in the axial direction. In this manner, the washer member 13 and the seal member 12 can be easily integrated with the sintered bearing 10 by only causing the bearing sleeve 11 and the washer member 13 to be engaged with each other through easy processing such as caulking.

Accordingly, as in the related art, compared to a configuration in which a seal member is directly bonded to a bearing sleeve, in the seal member 12 of the present embodiment, the seal member 12 is firmly sandwiched between the bearing sleeve 11 and the washer member 13 which are engaged with each other due to the caulking portions 24, 24, and so on. Therefore, there is no concern over a disadvantage of peeling off of the seal member from the bearing sleeve which may occur due to direct bonding such as tight contact, so that it is possible to realize a highly reliable sealing function with a simple configuration.

In addition, compared to a case where a bearing that supports a shaft and a seal that inhibits a fluid from moving along a valve shaft are individually incorporated as separate members, it is possible to realize functions as the bearing and a seal for a fluid with a simple configuration at low cost.

In addition, since the seal member 12 is interposed between the bearing sleeve 11 and the washer member 13, and the bearing sleeve 11 and the seal member 12 are integrated, a leak passage for a fluid, for example, gas flowing along the shaft can be eliminated, so that leakage of the fluid can be curbed.

In addition, since the inner diameter of the seal member 12 is formed to be smaller than the shaft diameter, the inner circumferential surface 23 of the seal member 12 is curved to the other surface 12b side on a side opposite to the one surface 12a of the seal member 12 which comes into contact with the flat surface 22 of the bearing sleeve 11. Accordingly, the one surface 12a of the seal member 12 can come into contact with the shaft over a wide area. Therefore, for example, in FIG. 2, in a case of an environment in which the one surface 12a side of the seal member 12 is at a low pressure and the other surface 12b side is at a high pressure, it is possible to more reliably seal a fluid G1 such as gas which tends to move from the other surface 12b side toward the one surface 12a side in the axial direction.

Figure 5:
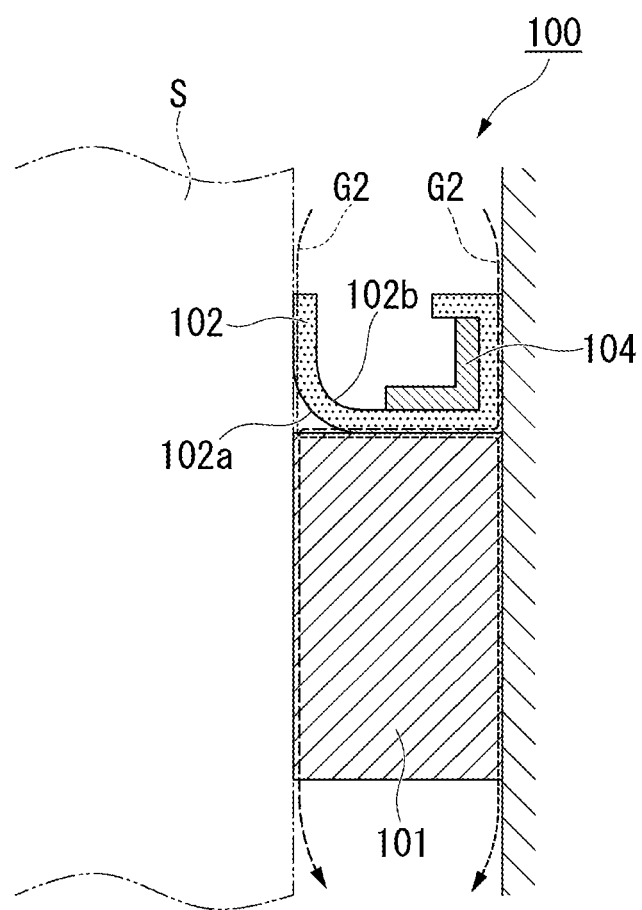
FIG. 5 is an enlarged cross-sectional view of a main portion illustrating a sintered bearing in the related art.

On the other hand, as illustrated in FIG. 5, a sintered bearing 100 in the related art has a structure in which an annular ring-shaped seal member 102 is mounted on one end side of a bearing sleeve 101, and the seal member 102 is interlocked inside an opening into which the sintered bearing 100 is inserted, due to a washer member 104.

In the sintered bearing 100 in the related art having such a configuration, the washer member 104 and the bearing sleeve 101 are not integrated. Therefore, for example, in FIG. 5, there is concern that a fluid G2 such as gas which tends to move from the other surface 102b side toward one surface 102a side of the seal member 102 in the axial direction may leak via a gap between the bearing sleeve 101 and the seal member 102.

In addition, in the seal member 12, since the inner circumferential surface 23 is curved to the other surface 12b side, a restoring force of returning from a curved state to an original non-curved state is generated in the seal member 12. Therefore, the inner circumferential edge on the inner circumferential surface 23 and the shaft more strongly come into tight contact with each other, so that it is possible to reliably seal a fluid such as gas which tends to flow along the shaft.

In the embodiment described above, an example in which the bearing member of the present invention is applied as a constituent component of an EGR valve provided in an EGR path of an EGR device has been described. However, the bearing member of the present invention can be widely applied to various instruments as a bearing member that inhibits a fluid around a shaft from moving and supports the shaft. The bearing member of the present invention is not limited to a constituent component of an EGR valve.

Second Embodiment

Figure 3:
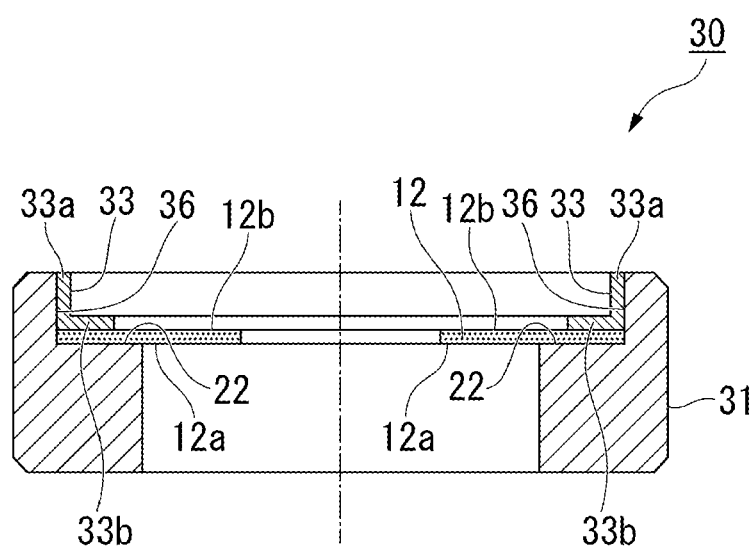
FIG. 3 is a cross-sectional view illustrating a sintered bearing according to a second embodiment of the present invention.

FIG. 3 is a cross-sectional view illustrating a sintered bearing according to a second embodiment of the present invention. The same reference signs are applied to members similar to those in the first embodiment illustrated in FIGS. 1 and 2, and description thereof will be omitted.

In a sintered bearing 30 of the second embodiment, in place of a bearing sleeve and an engagement member engaging with each other via a caulking portion as in the first embodiment, a washer member (engagement member) 33 which will serve as a press-fitted cap is used. This washer member 33 is an L-shaped member of which a cross section is parallel to the axial direction. The washer member 33 has an outer circumferential portion 33a cylindrically extending in the axial direction and an annular ring portion 33b extending inward from the outer circumferential portion 33a in a direction perpendicular to the axial direction. The outer diameter of the outer circumferential portion 33a is formed to be slightly larger than the inner diameter surrounded by an inner circumferential wall 36 continuously extending from the flat surface 22 of a bearing sleeve 31 in the axial direction.

In a state where the one surface 12a of the seal member 12 is disposed to come into contact with the flat surface 22 of the bearing sleeve 31, the annular ring portion 33b of the washer member 33 which will serve as a press-fitted cap is directed toward the other surface 12b of the seal member 12, and the outer circumferential portion 33a of the washer member 33 is press-fitted to the inner circumferential wall 36 of the bearing sleeve 31. Therefore, the seal member 12 is sandwiched between the flat surface 22 of the bearing sleeve 31 and the washer member 33, so that it is possible to realize the sintered bearing 30 in which the bearing sleeve 31 and the seal member 12 are integrated.

Third Embodiment

Figure 4:
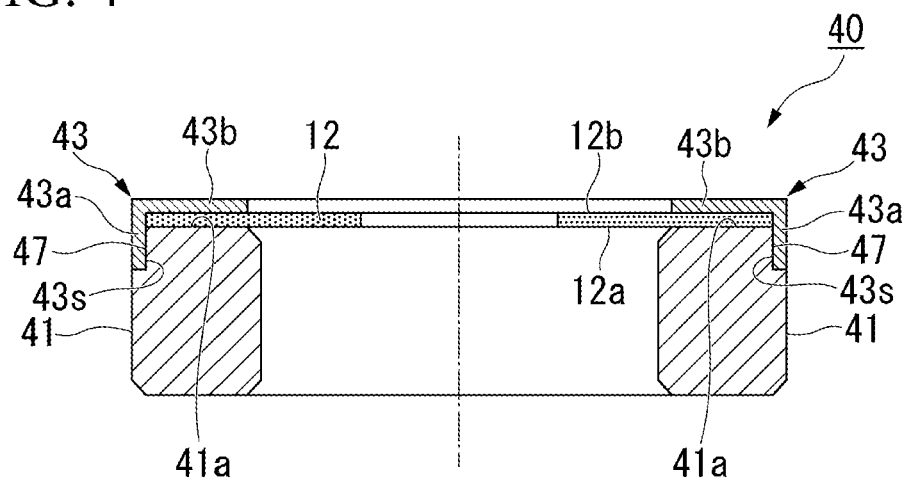
FIG. 4 is a cross-sectional view illustrating a sintered bearing according to a third embodiment of the present invention.

FIG. 4 is a cross-sectional view illustrating a sintered bearing according to a third embodiment of the present invention. The same reference signs are applied to members similar to those in the first embodiment illustrated in FIGS. 1 and 2, and description thereof will be omitted.

In a sintered bearing 40 of the third embodiment, in place of a bearing sleeve and an engagement member engaging with each other via a caulking portion as in the first embodiment, a washer member (engagement member) 43 which will serve as a press-fitted cap is used. This washer member 43 is an L-shaped member of which a cross section is parallel to the axial direction. The washer member 43 has an outer circumferential portion 43a cylindrically extending in the axial direction and an annular ring portion 43b extending inward from the outer circumferential portion 43a in a direction perpendicular to the axial direction. The washer member 43 is disposed to cover one end surface 41a of a bearing sleeve 41 in the axial direction.

In addition, a notch outer circumferential surface 47 which engages with an inner circumferential wall 43s of the outer circumferential portion 43a of this washer member 43 is formed in the bearing sleeve 41. The washer member 43 is formed such that the inner diameter surrounded by the inner circumferential wall 43s of the outer circumferential portion 43a is slightly smaller than the outer diameter of the notch outer circumferential surface 47 of the bearing sleeve 41.

In a state where the one surface 12a of the seal member 12 is disposed to come into contact with the one end surface 41a of the bearing sleeve 41 in the axial direction, the inner circumferential wall 43s of the outer circumferential portion 43a of the washer member 43 which will serve as a press-fitted cap is press-fitted to the notch outer circumferential surface 47 of the bearing sleeve 41. Therefore, the seal member 12 is sandwiched between the one end surface 41a of the bearing sleeve 41 in the axial direction and the annular ring portion 43b of the washer member 43, so that it is possible to realize the sintered bearing 40 in which the bearing sleeve 41 and the seal member 12 are integrated.

Hereinabove, several embodiments of the present invention have been described. However, these embodiments are presented as examples and are not intended to limit the scope of the invention. These embodiments can be performed in various other forms, and various omissions, replacements, and changes can be made within a range not departing from the gist of the invention. These embodiments or modifications thereof are included in the scope and the gist of the invention. Similarly, they are included in the invention disclosed in the claims and the scope equivalent thereto.

INDUSTRIAL APPLICABILITY

It is possible to provide a sintered bearing which integrally includes a seal member having higher reliability.

REFERENCE SIGNS LIST 10 sintered bearing
11 bearing sleeve
12 seal member
13 washer member (engagement member)
21 shaft hole
22 flat surface

The invention claimed is:

1. A sintered bearing comprising:
a bearing sleeve formed of a sintered material, a shaft hole being formed therein;
an annular ring-shaped seal member that is disposed such that one surface thereof comes into contact with the bearing sleeve; and
a washer member that comes into contact with an other surface of the seal member on a side opposite to the one surface and is configured for the seal member to engage with the bearing sleeve,
wherein the washer member is fixed to the bearing sleeve.

2. The sintered bearing according to claim 1,
wherein the bearing sleeve includes a flat surface extending in a direction perpendicular to an axial direction between one end of the bearing sleeve in the axial direction and the other end thereof in the axial direction, and the one surface of the seal member comes into contact with the flat surface.

3. The sintered bearing according to claim 2,
wherein an inner diameter of the seal member is smaller than a diameter of the shaft hole of the bearing sleeve.

4. The sintered bearing according to claim 1,
wherein the seal member is sandwiched between a shaft end surface of the bearing sleeve on one side and the washer member.

5. The sintered bearing according to claim 4,
wherein an inner diameter of the seal member is smaller than a diameter of the shaft hole of the bearing sleeve.

6. The sintered bearing according to claim 1,
wherein an inner diameter of the seal member is smaller than a diameter of the shaft hole of the bearing sleeve.

* * * * *